United States Patent [19]

Iwata et al.

[11] 4,376,878
[45] Mar. 15, 1983

[54] SWITCH ASSEMBLY FOR USE IN VEHICLE

[75] Inventors: Masayosi Iwata, Hashima; Kenshi Furuhashi, Nagoya; Tadashi Yokoyama, Kuwana, all of Japan

[73] Assignee: Kabushiki Kaisha Tokai Rika Denki Seisakusho, Aichi, Japan

[21] Appl. No.: 284,537

[22] Filed: Jul. 20, 1981

[30] Foreign Application Priority Data

Jul. 22, 1980 [JP] Japan .............................. 55-103589[U]

[51] Int. Cl.³ ............................................. H01H 3/16
[52] U.S. Cl. ................................. 200/61.27; 200/61.54
[58] Field of Search ......................... 200/61.27–61.38, 200/61.54

[56] References Cited

U.S. PATENT DOCUMENTS

| Re. 27,971 | 4/1974 | Suzuki et al. | 200/61.34 |
| 3,334,201 | 8/1967 | Mutschler et al. | 200/61.54 |
| 3,858,176 | 12/1974 | Miller et al. | 200/61.54 |
| 4,293,743 | 10/1981 | Iwata et al. | 200/61.54 |

FOREIGN PATENT DOCUMENTS 53-36656 10/1978 Japan .
55-8663 2/1980 Japan .

Primary Examiner—A. T. Grimley
Assistant Examiner—Morris Ginsburg
Attorney, Agent, or Firm—Wenderoth, Lind & Ponack

[57] ABSTRACT

A switch assembly for use in a vehicle including a body carrying a turn indicator switch and a dimmer and passing switch, a rotatable member rotatably mounted on the body for actuating the turn indicator switch, and a bifurcated lever having first and second arms. The first arm is pivotally connected to the rotatable member for pivotal movement of the lever in a direction perpendicular to the direction of rotation of the rotatable member and the second arm is provided in association with the dimmer and passing switch so that rotation of the lever together with the rotatable member controls the turn indicator switch and the pivotal movement of the lever controls the dimmer and passing switch. A plurality of vertical and horizontal notches are formed in a face between the first and second arms for the engagement with a pin mounted in the body to hold the lever in the pivoted and rotated positions.

9 Claims, 5 Drawing Figures

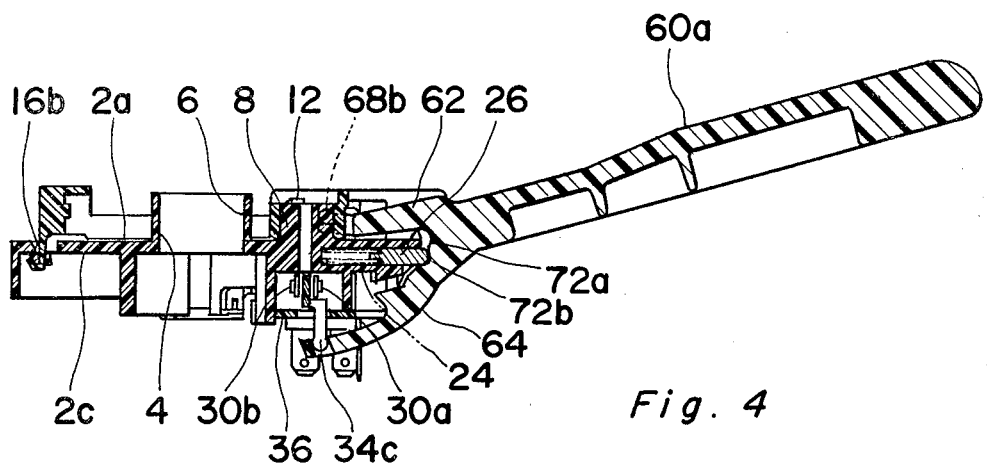
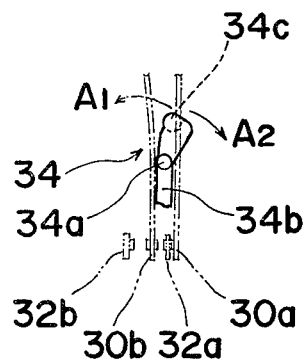
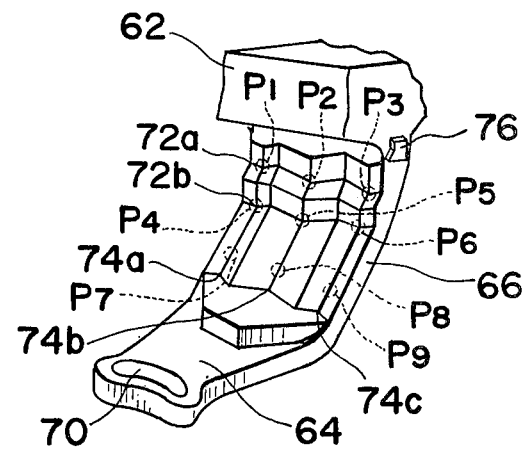
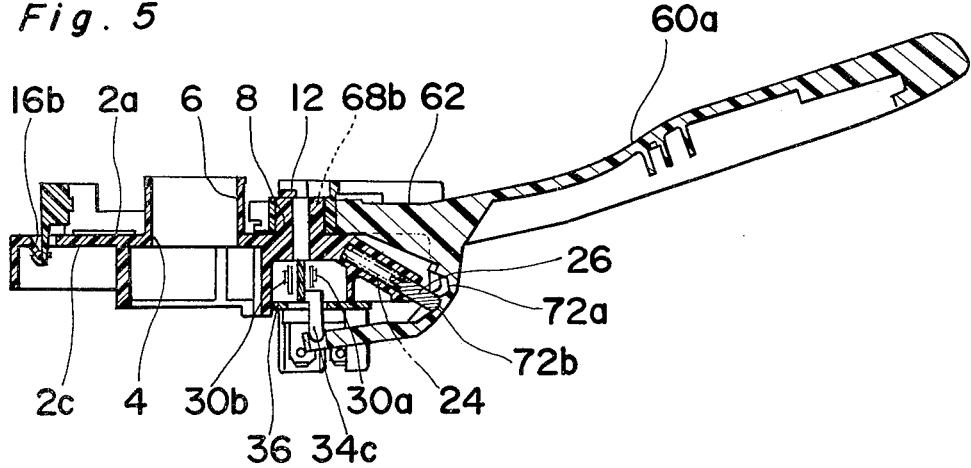

SWITCH ASSEMBLY FOR USE IN VEHICLE

BACKGROUND OF THE INVENTION

The present invention relates to a switch assembly, and more particularly, to a lever operable switch assembly for use in vehicle.

In many motor vehicles, a lever operable switch is mounted on a steering column for controlling various lights and instruments on the vehicle, for example, head lights, turn indicators, wipers, windshield washers, etc., and usually one lever operable switch controls two of these lights and instruments by the pivotal movements of a lever in directions parallel and perpendicular to the steering column.

There are many known forms of switch assemblies of the kind specified above, for example, those dislcosed in Japanese Patent application Publication No. (Tokkosho) 53-36656 and Japanese Utility Model application Publication No. (Jikkosho) 55-8663. In the arrangements shown in these publications, a body or base is fixedly connected to the steering column and a rotatable member is rotatably mounted on the body. A lever is pivotally mounted to the rotatable member so that the lever moves in a direction parallel to the steering column as it pivots about the rotatable member, and at the same time, moves in a direction perpendicular to the steering column when it rotates together with the rotatable member.

In the arrangement of Tokkosho No. 53-36656, the positioning of the lever in the rotated position, i.e., the position reached when the lever is rotated perpendicular to the steering column, is effected by the engagement between a pin mounted on the body and notches formed in the rotatable member. The positioning of the lever in the pivoted position, i.e., the position reached when the lever is pivoted about the rotatable member in a direction parallel to the steering column, is effected by the engagement between a ball point formed at the end of the lever and notches formed in the body.

Similarly, in the arrangement of Jikkosho No. 55-8663, the positioning of the lever in the rotated position is effected by the engagement between a pin mounted on the rotatable member and notches formed in the body, and the positioning of the lever in the pivoted position is effected by the engagement between a ball point formed at the end of the lever and notches formed in the body.

As is apparent from the above, the prior art switch assemblies have different mechanisms for positioning the lever in the rotated and pivoted positions.

Furthermore, in the above described switch assemblies, it has been necessary to provide a top plate or the like fixed on the rotatable member by means of suitable securing means, such as securing screw, to maintain the lever in pivotal connection with the rotatable member. Accordingly, the prior art switch assemblies are costly in terms of numbers of the components and manufacturing steps.

SUMMARY OF THE INVENTION

Accordingly, it is a primary object of the present invention to provide an improved switch assembly which can effect the positioning of the lever in the rotated and pivoted positions by a single engagement between the lever and the body.

It is another object of the present invention to provide a switch assembly of the above described type which can hold the lever without employing any top plate or the like.

It is a further object of the present invention to provide a switch assembly of the above described type which has a simple construction and can readily be manufactured at low cost.

In accomplishing these and other objects of the invention, there is provided a switch assembly according to the present invention which comprises a plate-like body having first and second faces opposite to each other and a side face, a projection extending perpendicularly from the first face of the plate-like body, and a pin mounted on the side face such that the pin extends, and is biased, outwardly from the plate-like body in a radial direction about an axis of the projection. A rotatable member having an opening formed therein is rotatably mounted on the projection, and has an engageable means and a first actuating means. A lever having one end bifurcated to define first and second arms is provided with the first arm having an engaging means pivotally engaged with the engageable means in such a manner that the lever pivots about engaging means in a direction perpendicular to the direction of rotation of the rotatable member, and the lever also rotates together with the rotation of the rotatable member about the projection. The second arm extends along the second face of the plate-like body and has a second actuating means. The lever has a plurality of vertical and horizontal notches in the form of mesh to define a plurality of tapered recesses on a surface between the first and second arms so that the pin engages in one of the tapered recesses to hold the lever in a rotated and pivoted position. A first switch means is mounted on the plate-like body and is actuated by the first actuating means as the rotatable member rotates. A second switch means is mounted on the plate-like body and is actuated by the second actuating means as the lever pivots.

BRIEF DESCRIPTION OF THE DRAWINGS

These and other objects and features of the present invention will become apparent from the following description of a preferred embodiment thereof taken in conjunction with the accompanying drawings, in which:

FIG. 2 is a cross-sectional view of the switch assembly of FIG. 1 in the assembled condition;

FIG. 3 is a diagrammatic view of a dimmer switch;

FIG. 4 is a partial enlarged perspective view of the lever particularly showing the details of a notched section; and FIG. 5 is a view similar to FIG. 2 but particularly showing a modification thereof.

DETAILED DESCRIPTION OF THE PREFERRED EMBODIMENT

Figure 1:
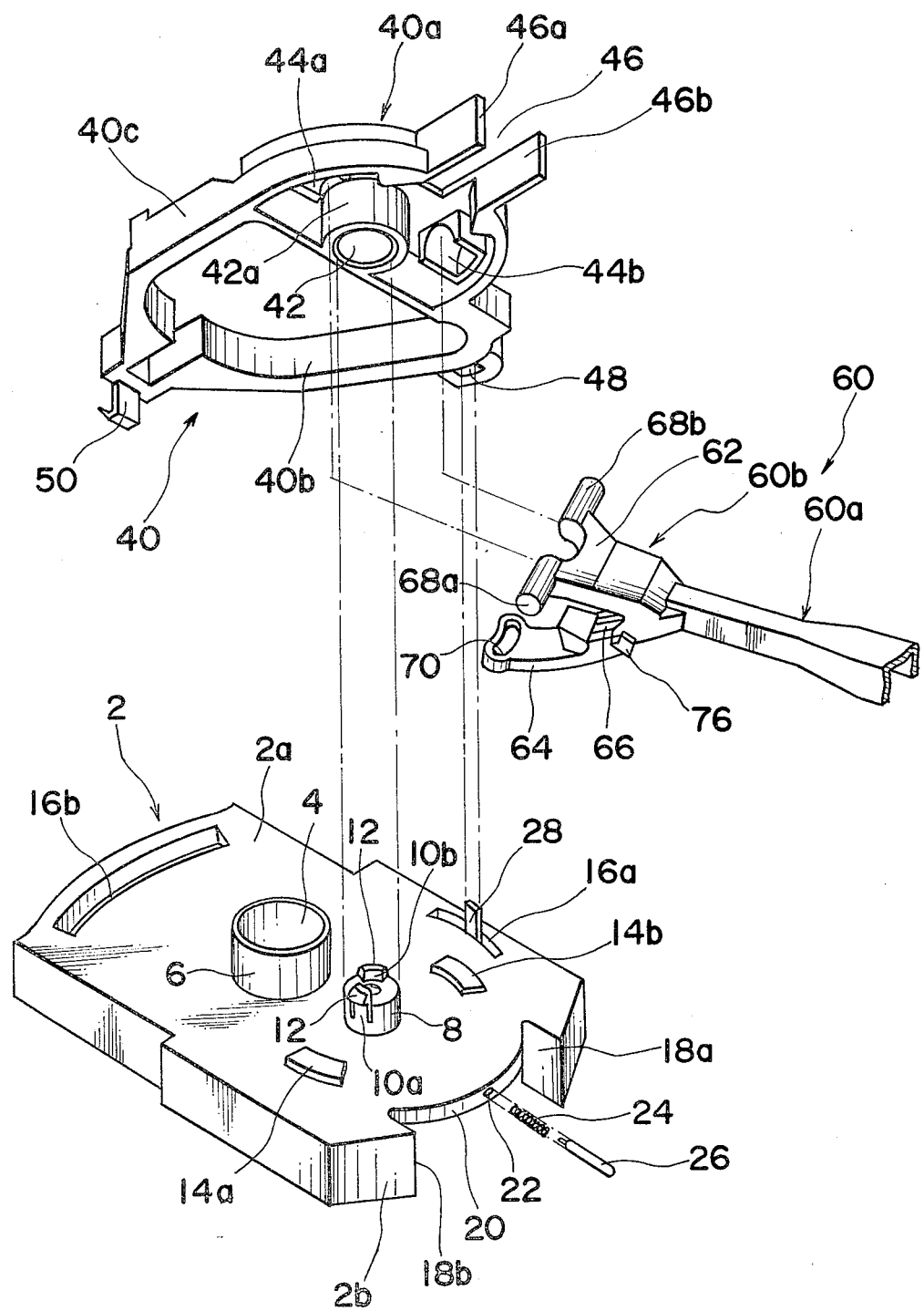
FIG. 1 is an exploded perspective view of a switch assembly according to the present invention.

A switch assembly according to the present invention and described herein in connection with the drawings is designed for use in an automobile for controlling head lights (not shown) between high and low beams, and also for controlling turn indicators (not shown).

Referring to FIGS. 1 and 2, a switch assembly according to a preferred embodiment comprises a body 2, a rotatable member 40 and a lever 60 which are made of synthetic resin and each of which is described in detail below.

The body 2 has a plate-like configuration defined by a top face 2a, a side face 2b and a bottom face 2c (FIG. 2), and has a circular opening 4 approximately at the center thereof. The opening 4 extends from the top face 2a to the bottom face 2c and is surrounded by a cylinder 6 for rotatably fitting onto a steering shaft (not shown). In its normal condition of use, the body 2 is fixedly connected to a steering column or chassis (not shown) of an automobile. A cylindrical projection 8 is mounted on the top face 2a adjacent the cylinder 6 with the cylindrical axes of cylinder 6 and cylindrical projection 8 parallel to each other. The cylindrical projection 8 has a pair of tongues 10a and 10b projecting parallel to the cylindrical axis and away from the top face 2a, each having an engagement pawl 12 at the end remote from the top face 2a. The engagement pawls 12 normally extend radially outwardly from the cylindrical projection 8 but can be forcibly moved within the outer circumferential surface of the cylindrical projection 8 by the resiliency of the tongues 10a and 10b. A pair of arcuate platforms 14a and 14b are mounted on the top face 2a on opposite sides of the cylindrical projection 8 equidistantly from the cylindrical axis of the projection 8.

The body 2 is further provided with an elongated opening 16a adjacent the platform 14b in a shape of arc with the center of the curvature on the cylindrical axis of the cylindrical projection 8. Another elongated opening 16b is provided the opposite side of opening 4 from the cylindrical projection 8 and also in the shape of an arc with the center of curvature on the cylindrical axis of the cylindrical projection 8.

The side face 2b of the body 2 is located close to the platforms 14a and 14b and projection 8 and has a pair of projections to define parallel opposing faces 18a and 18b, and an arcuate side face 20 between the opposing faces 18a and 18b. A bore 22 having a predetermined length extends from the center of the arcuate side face 20 toward the cylindrical axis of the projection 8 for receiving therein a coil spring 24 and a pin 26 in such a manner that a rounded head portion of the pin 26 projects outwardly from the bore 22.

The bottom face 2c of the body 2 has a space under the elongated opening 16a for accommodating a first switch which is a conventional three position turn indicator switch. The first switch has a switch lever 28 which extends through the elongated opening 16a and projects upwardly from the top face 2a, as shown in FIG. 1. The first switch has three positions which are a neutral position, a first actuated position in which the switch lever 28 is moved in one direction from the neutral position, and a second actuated position in which the switch lever 28 is tilted in the other direction. The first switch, the remaining details of which are not shown, is connected to turn indicator lights in a known manner.

The bottom face 2c further has another space under the cylindrical projection 8 for accommodating a second switch, namely a dimmer and passing switch, that shifts the beam condition of head lights between high and low. The dimmer switch includes, as shown in FIG. 3, a pair of movable reed contacts 30a and 30b and a pair of fixed contacts 32a and 32b. The movable contacts 30a and 30b are moved by an actuator 34 defined by an axle 34a rotatably supported in plate 2 between the bottom face 2c and a base plate 36 (FIG. 2 and FIG. 3), the base plate carrying the first and second switches, a fin 34b extending from the axle 34a between reed portions of the movable contacts 30a and 30b and a leg portion 34c extending downwardly from, and in offset relation with, the axle 34a, when viewed in FIG. 2, through an opening formed in the base plate 36.

In the position shown in FIG. 3, the dimmer switch is in a condition in which the movable contact 30a is held in contact with the fixed contact 32a, and the movable contact 30b is held between, and spaced from, the fixed contacts 32a and 32b by the biasing force of the fin 34b acting on the reed portion of the movable contact 30b. The dimmer switch in this position controls the power supply to the head lights so that they emit a low beam.

When the actuator 34 rotates about the axis of its axle 34a in a direction indicated by the arrow A1, the fin 34b pushes the movable contact 30a away from the fixed contact 32a, and at the same time, the fin 34b moves away from the reed portion of the movable contact 30b to permit contact between the movable contact 30b and the fixed contact 32a by the resilience of reed portion of the movable contact 30b. The dimmer switch in this position controls the power supply to the head lights to cause them to emit high beam.

When the actuator 34 rotates, on the other hand, in a direction indicated by the arrow A2, the fin 34b pushes the movable contact 30b towards the fixed contact 32b to establish a contact between the contacts 30b and 32b. This also causes the head lights to emit a high beam. When such rotation is effected temporarily it produces from the temporary emission of the high beam what is known as passing signal, as will be understood from the further description.

Referring particularly to FIG. 1, the rotatable member 40 has a half-circle body portion 40a and a pair of arms 40b and 40c extending from opposite edges of the half-circle body portion 40a. The arms 40b and 40c are connected with each other at the respective outer ends to define a wide opening through which the steering shaft (not shown) passes. The half-circle body portion 40a has a cylindrical portion 42a having therein a cylindrical opening 42 for rotatably receiving the cylindrical projection 8. When the projection 8 is inserted into the opening 42, the pawls 12 engage the upper edge of the opening 42 to hold the rotatable member 40 in association with the body 2. The rotatable member 40 further has a pair of semi-cylindrical grooves 44a and 44b on opposite sides of the opening 42 with the cylindrical axes of the grooves 44a and 44b being aligned with each other. It is to be noted that the axes of the grooves 44a and 44b may or may not intersect the cylindrical axis of the cylindrical opening 42 but must be in a perpendicular relation with the cylindrical axis of the cylindrical opening 42. An elongated guide opening 46 is defined between opposing walls 46a and 46b projecting from body portion 40a and is in perpendicular relation to the cylindrical axes of the grooves 44a and 44b. These grooves 44a and 44b and guide opening 46 are for pivotally receiving the lever 60 in a manner described later.

A recess 48 is provided the arm 40b adjacent the edge of the half-circle body portion 40a for receiving therein the switch lever 28 of the first switch. A hook 50 is provided at the position where the arms 40b and 40c are connected and is directed downwardly for engagement with the arcuate opening 16b formed in the body 2. The engagement of the hook 50 in the opening 16b prevents the arms 40c and 40b from being undesirably lifted away from the body 2.

The lever 60 includes a beam portion 60a and a bifurcated portion 60b integrally connected to the end of the beam portion 60a. The bifurcated portion 60b comprises first and second arms 62 and 64, and a notched section 66 located between the arms 62 and 64. The first arm 62 has at its end remote from the beam portion 60a, a pair of fingers 68a and 68b, the tips of which fingers protrude outwardly away from each other in a direction generally perpendicular to the beam portion 60a. Between the fingers 68a and 68b is a recess in the shape of a half-circle having a diameter greater than the diameter of the cylindrical portion 42a that surrounds the opening 42 so that when the fingers 68a and 68b are accommodated in the grooves 44a and 44b, respectively, the cylindrical portion 42a will not hinder the pivotal movement of the lever 60 in a direction parallel to the axis of the cylindrical opening 42. The second arm 64 has at its end remote from the beam portion 60a, an opening 70 for receiving the leg portion 34c of the actuator 34 in a manner described later.

Referring particularly to FIG. 4, the notched section 66 has two horizontal notches 72a and 72b and three vertical notches 74a, 74b and 74c in a form of a mesh to define six tapered recesses at intersecting points of the notches, which points are designated by reference characters P1, P2, P3, P4, P5 and P6. These points P1 to P6 are formed for the engagement by the rounded end of the pin 26. In addition, there are three more points P7, P8 and P9 at which the rounded end of the pin 26 engages as the lever 60 moves.

The lever 60 further has stops 76 on opposite sides of the notched section 66 (only the stop on the front side of lever 60 is visible in FIGS. 1 and 4, the other stop being at a corresponding position on the other side of lever 60) for restricting the degree of pivotal movement of the lever 60 by the engagement between the stops 76 and the edge of the walls 46a and 46b.

Next, the manner in which the body 2, rotatable member 40 and lever 60 are associated will be described.

First, the lever 60 is held with respect to the body 2 in such a manner that the fingers 68a and 68b of the lever 60 rest on the platforms 14a and 14b (FIG. 1) of the body 2, and at the same time, the opening 70 of the lever 60 receives the leg projection 34c of the actuator 34. In this position, the pin 26 is held in contact with one of the points P1 to P6 described above. Thereafter, the rotatable member 40 is mounted on the body 2 such that the opening 42 of the rotatable member 40 receives the projection 8 and the hook 50 engages in the arcuate opening 16b. In this position, the fingers 68a and 68b of the lever 60 are rotatably accommodated in the grooves 44a and 44b, respectively, while the first arm 62 of the lever 60 is slidingly held between walls 46a and 46b so that the lever 60 pivots about the axis of the fingers 68a and 68b in a direction parallel to the axis of the projection 8, and rotates together with the rotatable member 40 about the cylindrical axis of projection 8. Furthermore, in this position, the switch lever 28 of the first switch is inserted into the recess 48 of the rotatable member 40. Accordingly the pivotal movement of the lever 60 controls the dimmer and passing switch by moving the leg projection 34c and the rotation of the lever 60 together with the rotatable member 40 controls the first switch by moving the lever 28. This control is described in detail below.

At first, assuming that the lever 60 is in a position in which the pin 26 is engaged at the point P5 (hereinafter referred to as the initial position), the lever 28 of the first switch is in the neutral position and the dimmer and passing switch is in the condition shown in FIG. 3 so as to emit a low beam from the head lights. It is to be noted that a switch (not shown) for turning the head lights on and off is provided independently of the dimmer switch. When the lever 60 is pivoted downwardly, as viewed in FIG. 2, the pin 26 engages in the recess at point P2, resulting in rotation of the actuator 34 in the direction A1 shown in FIG. 3. Thus, the head lights emit a high beam. The return of the lever 60 to the initial position is effected manually by pushing the lever 60 upwardly. On the other hand, when the lever 60 is pivoted upwardly, the pin 26 slides along the vertical notch 74b to about the point P8. Since there is no horizontal notch that intersects the vertical notch 74b at the point P8, the operator must hold the lever 60 upwardly to keep the pin 26 at the point P8. In this position, the actuator 34 is rotated in the direction A2 to cause the headlights to emit high beam for generating a so-called passing signal. When the lever 60 is released, it is automatically returned to the initial position by spring 24.

Starting again from the initial position and when the lever 60 is rotated clockwise when viewed from above in FIG. 2, the pin 26 engages in the recess at point P4 resulting in movement of lever 28 to the first actuated position of the first switch. Thus, the turn indicator is actuated to indicate, e.g., right turning. The return of the lever 60 to the initial position is effected by an automatic lever returning mechanism (not shown) provided around the cylinder 6 in a known manner as shown, for example, in U.S. Pat. No. Re. 27,971. On the other hand, when the lever 60 is rotated counterclockwise from the initial position, the pin 26 engages in the recess at point P6 resulting in movement of the lever 28 to the second actuated position of the first switch. Thus, the turn indicator is actuated to indicate left turning.

It is to be noted that the turning of the first switch to actuate a right or left indicator signal can be carried out from the position when the pin 26 is engaged in the recess at point P2. In this case, the pin 26 is engaged in the recess at point P1 or P3, respectively. Furthermore, when the pin 26 is engaged in the recesses at points P4 or P6, it is possible to produce a passing signal by the upward pivotal motion of the lever 60, resulting in engagement of the pin 26 in the notches at points P7 or P9, respectively.

Referring to FIG. 5, there is shown a modification of the switch assembly described above. The switch assembly shown has the same parts and elements but the direction of the bore 22 is tilted.

It is to be noted that the switch assembly of the present invention can be used for controlling equipment other than head lights and turn indicators, e.g., wipers and windshield washers.

Although the present invention has been fully described with reference to the accompanying drawings, many modification and variations thereof will be apparent to those skilled in the art, and the scope of the present invention is therefore to be limited not by the details of the preferred embodiment described above, but only by the terms of the appended claims.

What is claimed is:

1. A switch assembly for use in vehicle comprising:
a plate-like body for being fixedly connected to a chassis of the vehicle, said plate-like body having first and second faces opposite to each other and a side face;
a projection extending perpendicularly from said first face of said plate-like body;

a pin mounted on said side face for movement inwardly and outwardly from said plate-like body in a radial direction to the axis of said projection and spring means engaged with said pin and biasing said pin outwardly;

a rotatable member having an opening therein in which said projection is engaged for rotatably mounting said rotatable member on said plate-like body, said rotatable member also having a first actuating means;

a lever having one end bifurcated to define first and second arms, said first arm being pivotally mounted on said rotatable member for pivotal movement in a direction perpendicular to the direction of rotation of said rotatable member, and for rotation together with the rotation of said rotatable member about said projection, and said second arm extending along said second face of said plate-like body and having a second actuating means, said lever having a plurality of vertical and horizontal notches in a form of mesh and defining a plurality of tapered recesses on a surface of said lever between said first and second arms, said pin being in the respective ones of said tapered recesses to hold the lever in rotated and pivoted positions;

first switch means mounted on said plate-like body and being engaged by said first actuating means for being actuated by said first actuating means as said rotatable member rotates; and second switch means mounted on said plate-like body and being engaged by said second actuating means for being actuated by said second actuating means as said lever pivots.

2. A switch assembly as claimed in claim 1, further comprising at least one engagement pawl integral with said projection for engaging said rotatable member for maintaining the projection in the opening in said rotatable member.

3. A swtich assembly as claimed in claim 2 in which said first arm of said lever is pivotally mounted on the face of said rotatable member facing said plate-like body, whereby said first arm is held between said rotatable member and said plate-like body.

4. A switch assembly as claimed in claim 3 wherein said rotatable member has semi-cylindrical grooves on opposite sides of said opening, the cylindrical axes of said grooves being in alignment with each other and being perpendicular to the axis of said opening, and said first arm has means thereon rotatably mounted in said grooves.

5. A swtich assembly as claimed in claim 4 wherein said means is a pair of fingers on said first arm, the tips of said fingers being cylindrical and being coaxially aligned with each other.

6. A switch assembly as claimed in claim 1 wherein said first switch means has a switch lever therein and said first actuating means comprises means defining a recess in which said switch lever is engaged.

7. A switch assembly as claimed in claim 1 wherein said second switch means has a leg thereon and said second actuating means is means defining a bore in which said leg is engaged.

8. A switch assembly as claimed in claim 1 wherein there are three vertical notches and two horizontal notches and six tapered recesses at the intersecting points of the respective notches.

9. A switch assembly as claimed in claim 8 wherein the three recesses along one horizontal notch are on said lever in a position for being engaged by said pin when said lever is in an intermediate position of pivotal movement, and the remaining three recesses along the other horizontal notch are positioned on said lever for being engaged by said pin when said lever is pivoted in one direction of pivotal movement, and said vertical notches having portions extending away from the first-mentioned three recesses in a direction opposite the direction in which the second-mentioned three recesses are spaced from said first-mentioned three recesses and being free of recesses, the surface of said portions of said vertical recesses being at an angle to the axis of said pin for causing said spring means to exert a force on said pin for returning said lever to the intermediate position when said lever has been pivoted to a position where said pin engages said portion of one of said three vertical notches.

* * * * *